United States Patent
Chen et al.

(10) Patent No.: US 6,545,378 B2
(45) Date of Patent: Apr. 8, 2003

(54) ELECTRIC SPINDLE MOTOR WITH MAGNETIC BEARING AND HYDRODYNAMIC BEARING

(75) Inventors: Shixin Chen, Singapore (SG); Qide Zhang, Singapore (SG)

(73) Assignee: Data Storage Institute, Singapore (SG)

( * ) Notice: Subject to any disclaimer, the term of this patent is extended or adjusted under 35 U.S.C. 154(b) by 0 days.

(21) Appl. No.: 10/036,673

(22) Filed: Dec. 21, 2001

(65) Prior Publication Data

US 2002/0089245 A1 Jul. 11, 2002

(30) Foreign Application Priority Data

Dec. 23, 2000 (SR) .......................... 20007673-7

(51) Int. Cl.[7] ............... G02B 26/10; F16J 15/43
(52) U.S. Cl. ............... 310/67 R; 310/67 R; 310/90; 310/90.5; 310/91; 310/80; 310/68 D
(58) Field of Search ............... 310/90, 67 R, 310/90.5, 91, 68 D, 80, 680; 277/80

(56) References Cited

U.S. PATENT DOCUMENTS

| | | | |
|---|---|---|---|
| 4,805,972 A | * | 2/1989 | Tamaka .................. 350/6.7 |
| 4,806,835 A | | 2/1989 | Habermann |
| 4,929,158 A | | 5/1990 | Girault |
| 5,126,612 A | | 6/1992 | Girault |
| 5,283,491 A | | 2/1994 | Jabbar et al. |
| 5,358,339 A | | 10/1994 | Konno et al. |
| 5,463,511 A | | 10/1995 | Nakano et al. |
| 5,545,937 A | | 8/1996 | Dunfield et al. |
| 5,561,335 A | | 10/1996 | Dunfield et al. |
| 5,673,412 A | * | 9/1997 | Kamo ..................... 395/441 |
| 5,697,708 A | | 12/1997 | Leuthold et al. |
| 5,739,609 A | | 4/1998 | Ueyama et al. |
| 5,760,509 A | | 6/1998 | Chung |
| 5,770,906 A | | 6/1998 | Hazelton et al. |
| 6,378,874 B1 | * | 4/2002 | Dorulla .................. 277/410 |

FOREIGN PATENT DOCUMENTS

| | | |
|---|---|---|
| EP | 0875685 A2 | 11/1998 |
| GB | 2296945 A | 7/1996 |

* cited by examiner

Primary Examiner—Thomas M. Dougherty
Assistant Examiner—I A Mohandesi
(74) Attorney, Agent, or Firm—Blakely Sokoloff Taylor & Zafman LLP

(57) ABSTRACT

An electric spindle motor for use in precision instruments such as hard disk drives comprises a stationary sub-assembly and a rotary sub-assembly movable relative to the stationary sub-assembly for carrying magnetic disks. The electric spindle motor has an integrated bearing system including a hydrodynamic journal bearing for providing desired radial load and a magnetic bearing for reducing friction resistance during staring/stopping and running of the electric spindle motor. The rotary sub-assembly is suspended from the stationary sub-assembly by the activation of the magnetic bearing during the rotating of the electric spindle motor. The electric spindle motor having integrated hydrodynamic journal bearing and magnetic bearing of the present invention is capable of high speed and high accuracy running, providing increased radial load and stiffness, and reduces the friction resistance therefore improves the performance and power saving.

34 Claims, 7 Drawing Sheets

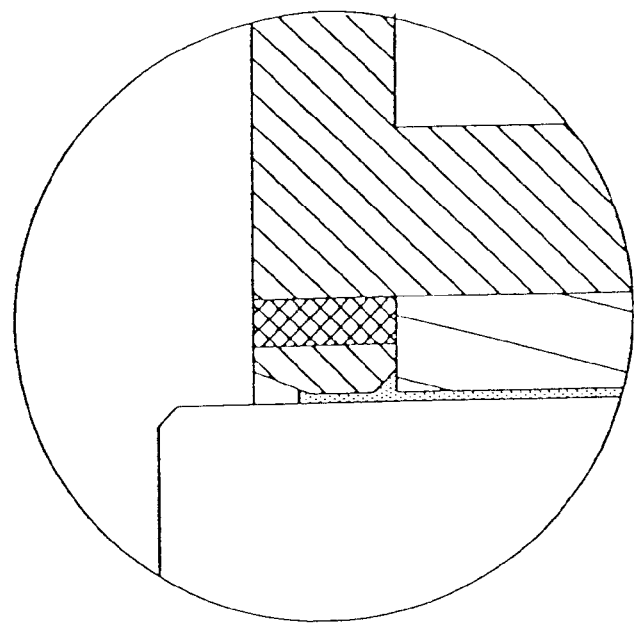
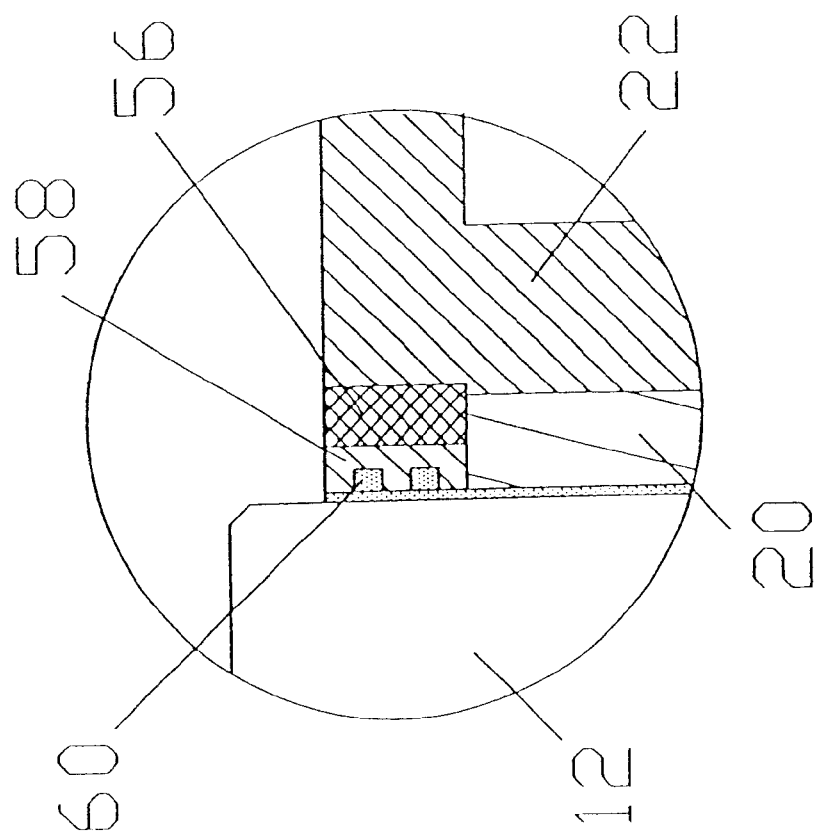
FIGURE 6A
FIGURE 6B

ELECTRIC SPINDLE MOTOR WITH MAGNETIC BEARING AND HYDRODYNAMIC BEARING

CROSS REFERENCE TO RELATED APPLICATIONS

This application claims priority to Singapore patent application number 200007673-7, filed on Dec. 23, 2000, entitled ELECTRIC SPINDLE MOTOR WITH MAGNETIC BEARING AND HYDRODYNAMIC BEARING, which is hereby incorporated by reference.

FIELD OF THE INVENTION

The present invention relates to an electric spindle motor, in particular it relates to an electric spindle motor with an integrated magnetic bearing and hydrodynamic bearing for use in data storage devices such as hard disk drives, optical drives or other precision instruments.

BACKGROUND OF THE INVENTION

Electric spindle motors are widely used in precision instruments such as hard disk drives, optical drives, magnetic-optical drives, printers or similar devices to meet high speed, high precision, low acoustic noise and low power consumption requirements of these applications. Conventional ball bearing spindle motors have been attempted for use in the above applications. Due to the drawbacks such as higher non-repeatable runout as well as higher acoustic noise caused by imperfect geometry on the inner race, outer race and the rolling elements, conventional ball bearing spindle motors are unlikely suitable for the next generation of precision instruments such as hard disk drives. Fluid film bearings have no direct surface contact during operation hence may be an alternative solution in replacement of the ball bearings for use in hard disk drives. One of the major difficulties for the application of fluid film bearing in hard disk drives is the liquid lubricant leakage which may degrades the performance of the fluid bearing. Lubricant leakage will also contaminate the surfaces of the disks leading to failures of the hard disk drive.

U.S. Pat. No. 5,283,491 to Jabbar et al and U.S. Pat. No. 5,760,509 to Chung et al disclose spindles with aerodynamic bearings which may have no risk of lubricant leakage. However, aerodynamic bearings have relatively lower load capacity and lower stiffness compared with the hydrodynamic bearings at similar range of geometric configuration. Furthermore, the rotor part and the stator part are electrically insulated hence there is no path for electrical discharge during operation of the spindle. This may result in possible damage of relevant part of the spindle such as the magneto-resistive (MR) head and cause failure of the hard disk drives. Aerodynamic bearings also have relative higher wear ratio, especially during the starting and stopping period of the spindle motor.

To overcome the above mention drawbacks in prior inventions, a hybrid bearing system, that is, an integration of hydrodynamic journal bearings and magnetic thrust bearings is provided by the present application. The present invention minimizes the friction between the bearing matting surfaces in a hydrodynamic thrust bearing therefore is power saving; fast starting and stopping with reduced contamination and cost-effective.

SUMMARY OF THE INVENTION

It is a first aspect of the present invention that an electric spindle motor disclosed has an improved radial load capacity and a reduced friction resistance.

It is a second aspect of the present invention that an integrated structure is disclosed for an electric spindle motor using a hydrodynamic journal bearing together with a magnetic bearing.

In accordance with the first and second aspects above, the electric spindle motor of the present invention comprises a stationary sub-assembly having a base and a first supporting means mounted on the base; a rotary sub-assembly having a rotating axis and a second supporting means for movably receiving the first supporting means; a hydrodynamic journal bearing interposed between the first and the second supporting means; and a magnetic bearing set positioned between the stationary sub-assembly and the rotary sub-assembly. The magnetic bearing set has at least one pair of electromagnets and at least one pair of thrust plates interactively associated with the at least one pair of electromagnets for controllably suspending the rotary sub-assembly from the stationary sub-assembly.

Preferably, the hydrodynamic journal bearing further comprises a first section, a second section and a gap therebetween for containing a lubricant.

Preferably, the electric spindle motor further comprises a sealing means for insulating the hydrodynamic journal bearing and discharging static electric charges from the rotary sub-assembly.

Preferably, the electric spindle motor further comprises at least one pair of permanent magnets respectively mounted on the at least on pair of thrust plates whereby providing a pre-load for keeping the rotary sub-assembly resting on the stationary sub-assembly.

Alternatively, the pair of electromagnets are offset from the pair of thrust plates along an axial direction of the rotating axis of the rotary sub-assembly.

Alternatively, the pair of electromagnets being offset from the pair of thrust plates along an redial direction of the rotating axis of the rotary sub-assembly.

Alternatively, the first supporting means comprises a shaft and the second supporting means comprises a sleeve.

Alternatively, the first supporting means comprises a sleeve and the second supporting means comprises a shaft.

The electric spindle motor having integrated hydrodynamic journal bearing and magnetic bearing of the present invention is capable of high speed and high accuracy running, providing increased radial load and stiffness, and reduces the friction resistance therefore improves the performance and power saving.

BRIEF DESCRIPTION OF THE DRAWINGS

FIGS. 6A and 6B are enlarged views showing the magnetic seals of the electric spindle motor according to the present invention.

DETAILED DESCRIPTION OF THE PREFERRED EMBODIMENTS

Figure 1:
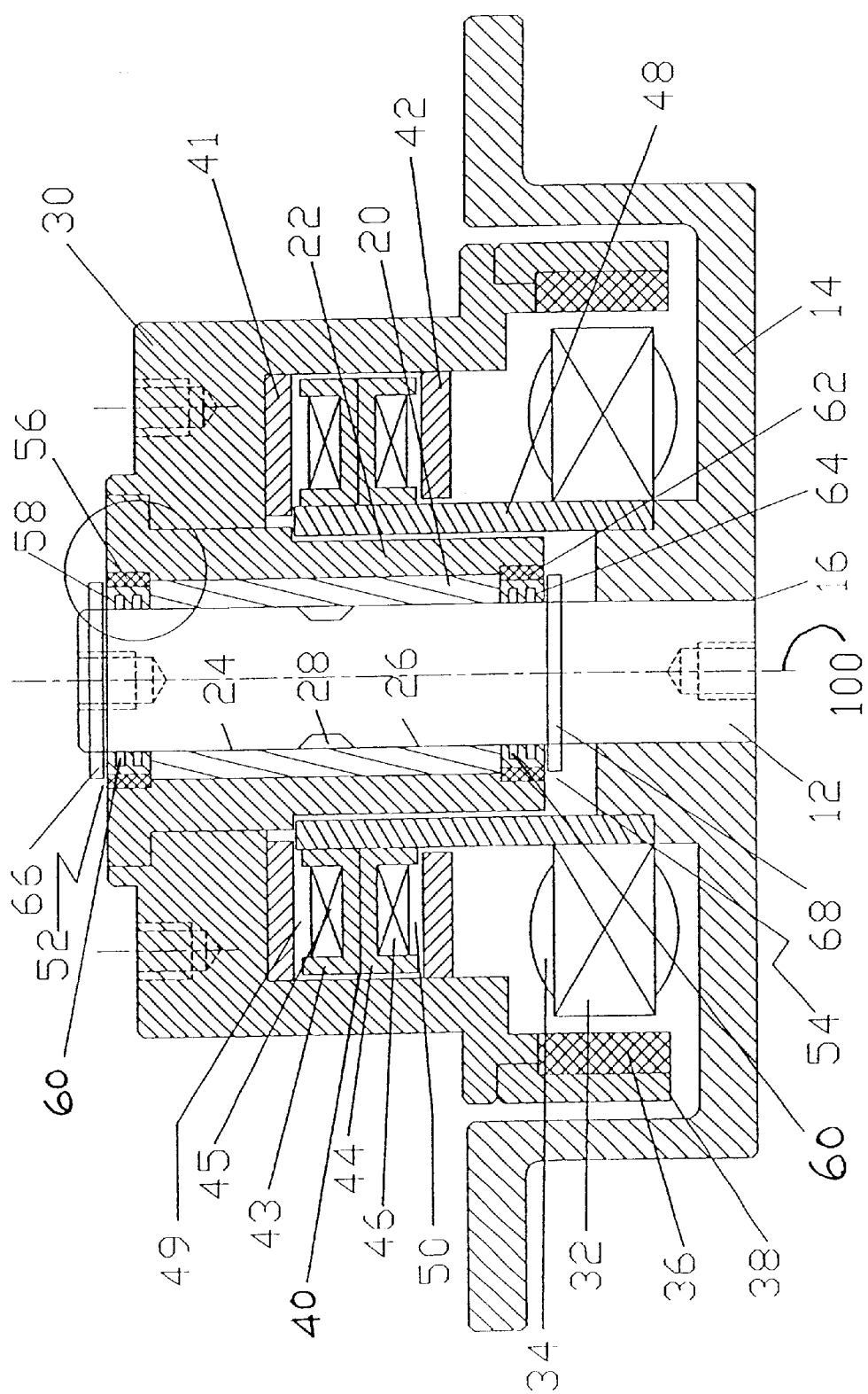
FIG. 1 is a cross sectional view of an electric spindle motor according to a first embodiment of the present invention.

As shown in FIG. 1, the electric spindle motor according to a first embodiment of the present invention for use in a hard disk drive comprises a stationary sub-assembly and a rotary sub-assembly. The term "stationary sub-assembly" here refers to the parts of the electric spindle motor mounted to the housing of the hard disk drive, and the term "rotary sub-assembly" refers to the parts of the electrical spindle motor for carrying a plurality of disks and is movable relative to the stationary sub-assembly. The stationary sub-assembly includes a base 14 and a shaft 12 mounded onto the base 14 through an opening 16. A stator lamination 32 and a coil winding 34 are formed on the stationary sub-assembly. The rotary sub-assembly is rotatable about a rotating axis 100 and includes a hub 30 and a sleeve housing 22 mounted onto the hub 30 for supporting a shaft sleeve 20. The rotary sub-assembly and the stationary sub-assembly are movably connected through the shaft sleeve 20 and the shaft 12. A hydrodynamic bearing including a first section 24 and a second section 26 separated by a gap 28 and is formed between the inner surface of the shaft sleeve 20 and the outer surface of the shaft 12. A lubricant (not shown) can be filled in the gap 28. The hydrodynamic bearing set provide radial load capacity and radial stiffness and guide the rotating portion of the spindle together with its load rotating around the shaft 12.

The rotary sub-assembly further includes a yoke 38 and a magnet 36 which correspond to the stator lamination 32 and the coil winding 34 to form a driving sub-assembly for driving the rotary sub-assembly rotating relative to the stationary sub-assembly at a range of predetermined angular velocity.

A pair of thrust plate 41 and 42 are securely attached to the hub 30. A pair of thrust bearing stators 43 and 44 with their respective pair of coils 45 and 46 are fixed to the base 14 through an extension 48. The pair of thrust bearing stators 43 and 44 are placed in between and are interactively associated with the pair of thrust plates 41 and 42 to form a magnetic bearing set 40 which includes a first thrust bearing 49 and a second thrust bearing 50. The thrust bearing stators 43 and 44 are back-to-back oriented with each other and axially facing their associated thrust plate 41 and 42, respectively. A first magnetic force of the thrust bearing 49 is generated between the thrust plate 41 and the thrust bearing stator 43, and is substantially parallel to the axial direction of the shaft 12 when an electric current is applied to the coil 45. Similarly, a second magnetic force of the thrust bearing 50 is also generated between the thrust plate 42 and the thrust bearing stator 44 along the axial direction of the shaft 12 when a current is applied to the coil 46. The first and second magnetic forces can axially suspend and maintain the rotary sub-assembly in a non-contact position from the stationary sub-assembly. The first and second forces enable the spindle motor to have a fast starting and stopping without bearing surface rubbing, and a low friction resistance during rotation. Risks of bearing wear and particulate generation will be much reduced. In addition, a radial magnetic force can be generated by the magnetic bearing set which may keep the axis of the thrust bearing stators 43 and 44 aligned with the thrust plates 41 and 42. This radial force cooperates with the hydrodynamic journal bearing to increase the radial load capacity and stiffness, therefore enhances the performance of the hydrodynamic bearing set.

It is appreciated that under the inventive concept of the present invention, the structure of the electric spindle motor may also be altered by mounting the shaft onto the rotary sub-assembly and mount the sleeve onto the stationary sub-assembly.

A first seals 52 and a second 54 are applied at two ends of the hydrodynamic bearing. The first seal 52 includes a magnet ring 56, a sealing ring 58, a first cylindrical surface of the shaft 12 and a ferrofluid 60. The second seal 54 includes a magnet ring 62, a sealing ring 64, a second cylindrical surface of the shaft 12 and the ferrofluid 60. The magnetic force captures the ferrofluid 60 within the gaps between the shaft 12 and the magnetic sealing rings 56 and 64. The magnetic seals effectively prevent the lubricant from leaking out of the hydrodynamic bearings. A first absorber 66 and a second absorber 68 are provided at the ends of the hydrodynamic journal bearing for absorbing any liquid from the hydrodynamic journal bearing and preventing the liquid from contaminating the disk surfaces due to the evaporation at certain condition such as low environment pressure.

Figure 2:
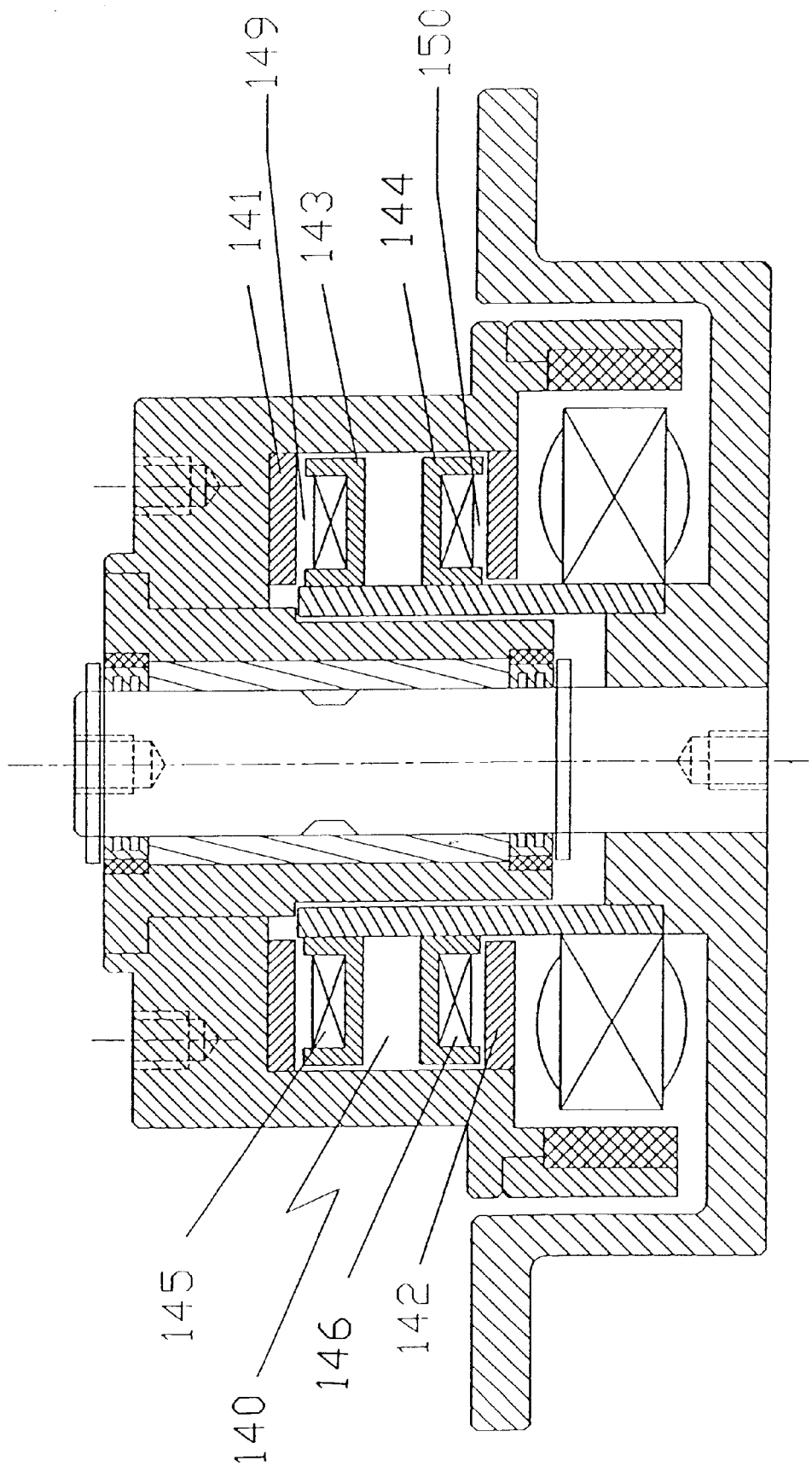
FIG. 2 is a cross sectional view of an electric spindle motor according to a second embodiment of the present invention.

A second embodiment of the present invention shown in FIG. 2 discloses an electric spindle motor including magnetic thrust bearings 149 and 150, which comprises a pair of thrust plate 141, 142, a pair of thrust bearing stators 143, 144, and a pair of coils 145, 146. This embodiment is configured same as the first embodiment except that a magnetic thrust bearing set 140 is formed by separating the two magnetic thrust bearings 149 and 150.

Figure 3:
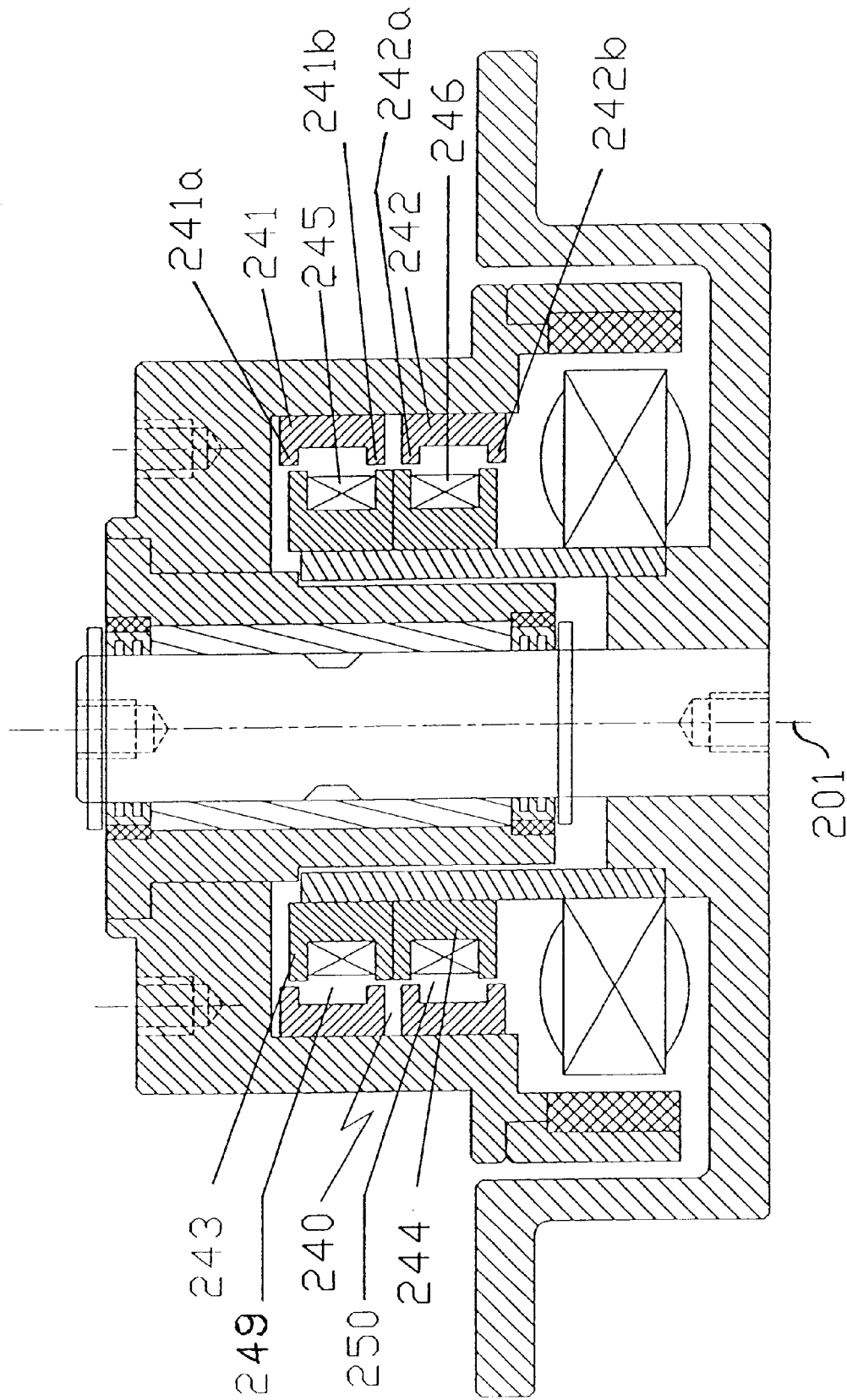
FIG. 3 is a cross sectional view of an electric spindle motor according to a third embodiment of the present invention.

A third embodiment of the present invention shown in FIG. 3 discloses an electric spindle motor including magnetic thrust bearings 249 and 250, which comprises a pair of thrust plate 241, 242, a pair of thrust bearing stators 243, 244, and a pair of coils 245, 246. In this embodiment, the pair of thrust bearing stators 243 and 244 are placed side-by-side and facing outwardly along a direction substantially perpendicular to the rotating axis 201. The pair of thrust plates 241 and 242 are in a form of ring shape and are placed surrounding the respective pair of thrust bearing stators 243 and 244. Two pairs of magnetic poles 241a, 241b and 242a, 242b are formed at protrusions on the pair of plates 241 and 242 respectively. The pair of thrust bearing stators 243, 244 are offset with the pair of thrust plate 241, 242 along an axial direction of the rotating axis 201, and are inwardly offset in between the pair of thrust plate 241, 242, whereby two alignment forces can be generated. The two forces are thrust forces to keep the rotating assembly at a desired axial position. Simultaneously, attraction forces are generated between the pair of thrust bearing stators 243, 244 are offset with the pair of thrust plate 241, 242 along a radial direction, which is cooperative with the hydrodynamic journal bearing for withstanding the radial load the electric spindle motor.

Figure 4:
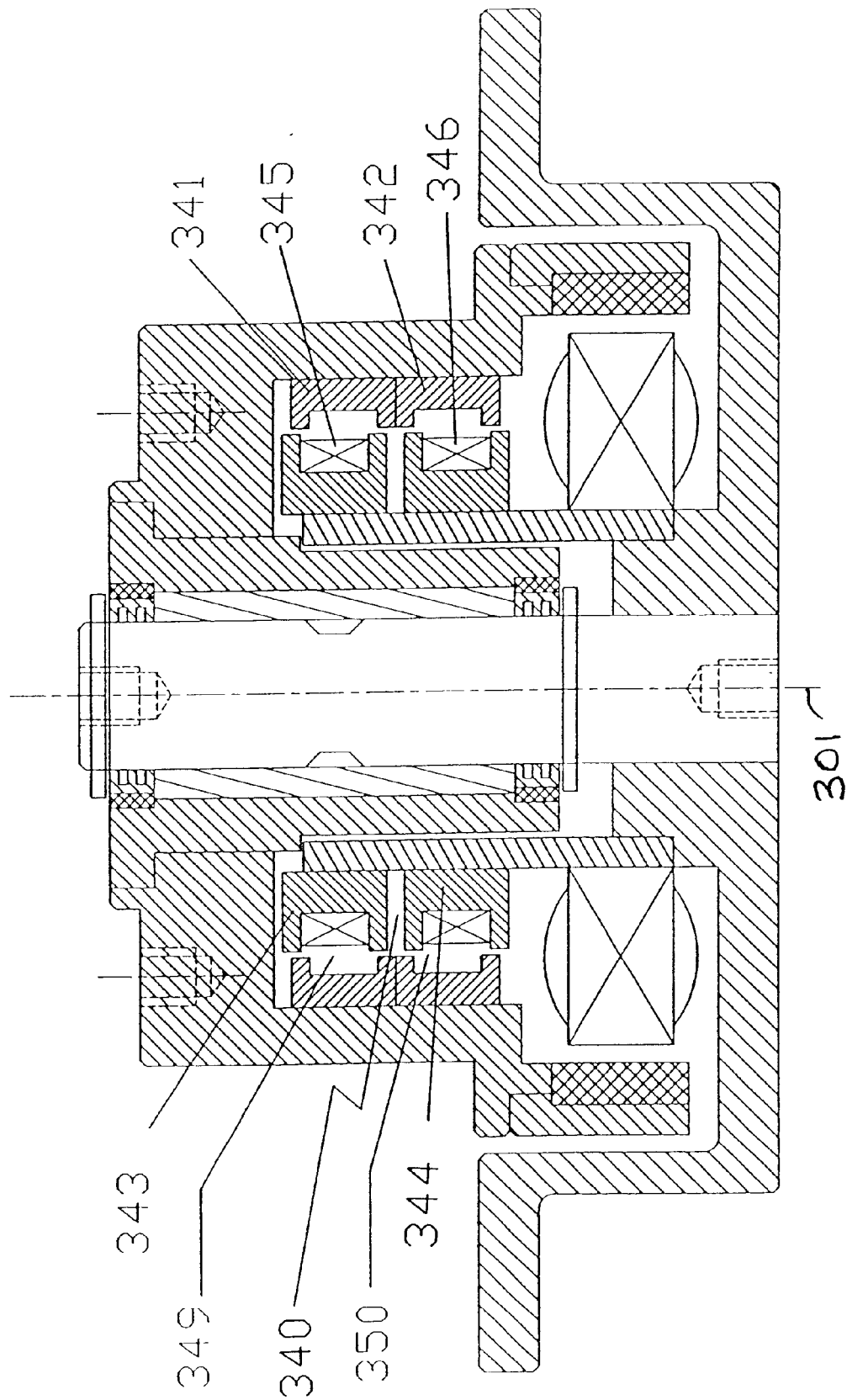
FIG. 4 is a cross sectional view of an electric spindle motor according to a forth embodiment of the present invention.

A fourth embodiment of the present invention shown in FIG. 4 discloses an electric spindle motor with configurations same as the third embodiment, except that the pair of thrust plate 341, 342 are outwardly offset from the pair of thrust bearing stators 343, 344 for generating alignment forces alone the axial direction of the rotating axis 301 to keep the rotating assembly at a desired axial position.

Figure 5:
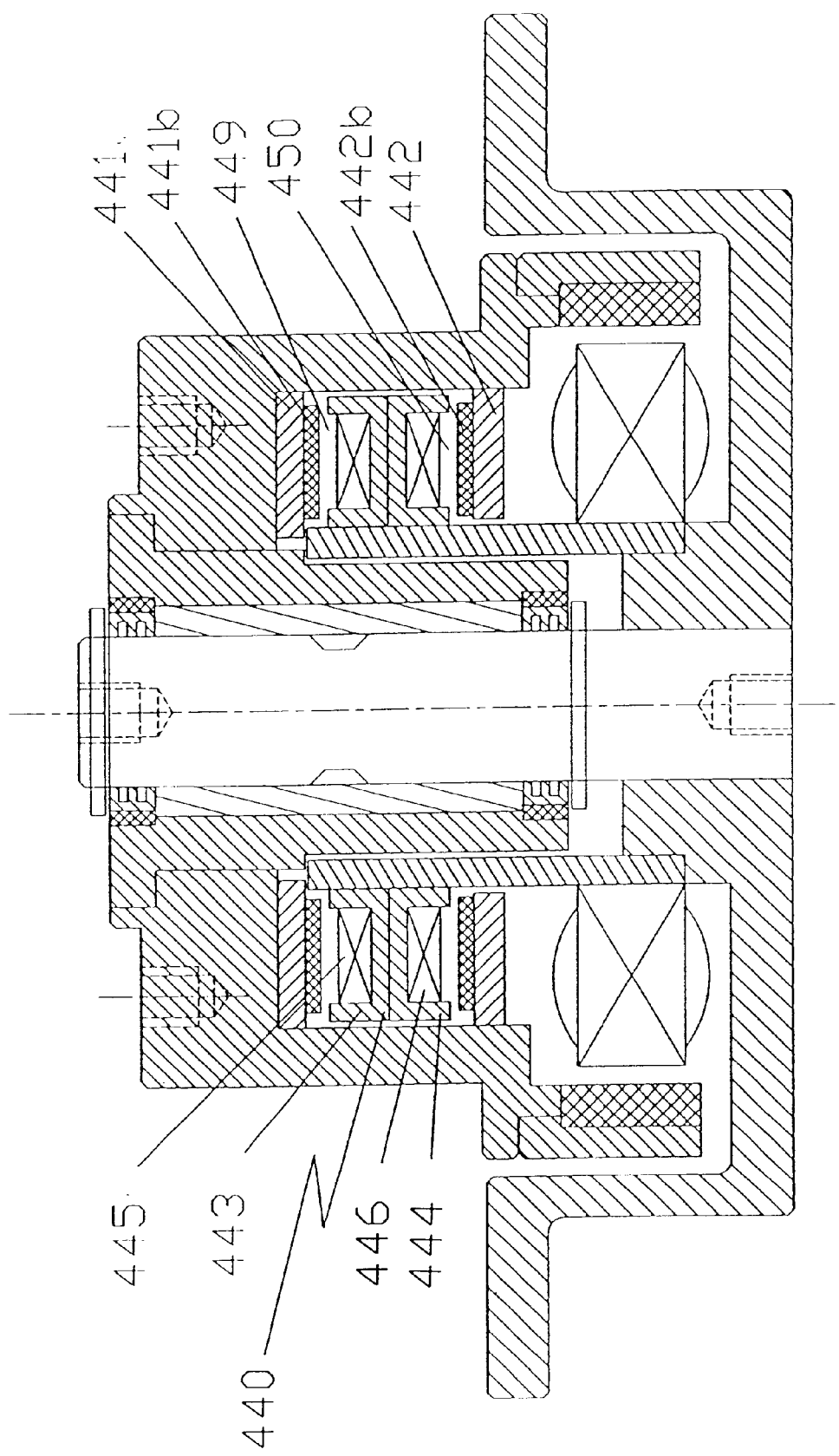
FIG. 5 is a cross sectional view of an electric spindle motor according to a fifth embodiment of the present invention.

FIG. 5 shows a fifth embodiment of the present invention. A pair of annular permanent magnets 441b and 442b are mounted onto the respective pair of thrust plates 441 and 442. A thrust force an be generated the by the pair of permanent magnets 441b and 442b when the pair of thrust bearing stators 443 and 444 are not activated. The thrust force serves to provide pre-load to keep the rotary sub-assembly rest on the stationary sub-assembly. This will reduce the risk of damaging spindle motors during shipment. The magnetic thrust bearings can be activated to suspend the rotary sub-assembly from the stationary sub-assembly when the electric spindle motor is desired to work.

FIGS. 6A and 6B shows two alternatives of the sealing means for use with the electric spindle motor of the present invention. In FIG. 6A, the ferrofluid 60 are retained in annular groove while in FIG. 6B the ferrofluid 60 are retained in a wedge.

Figure 7:
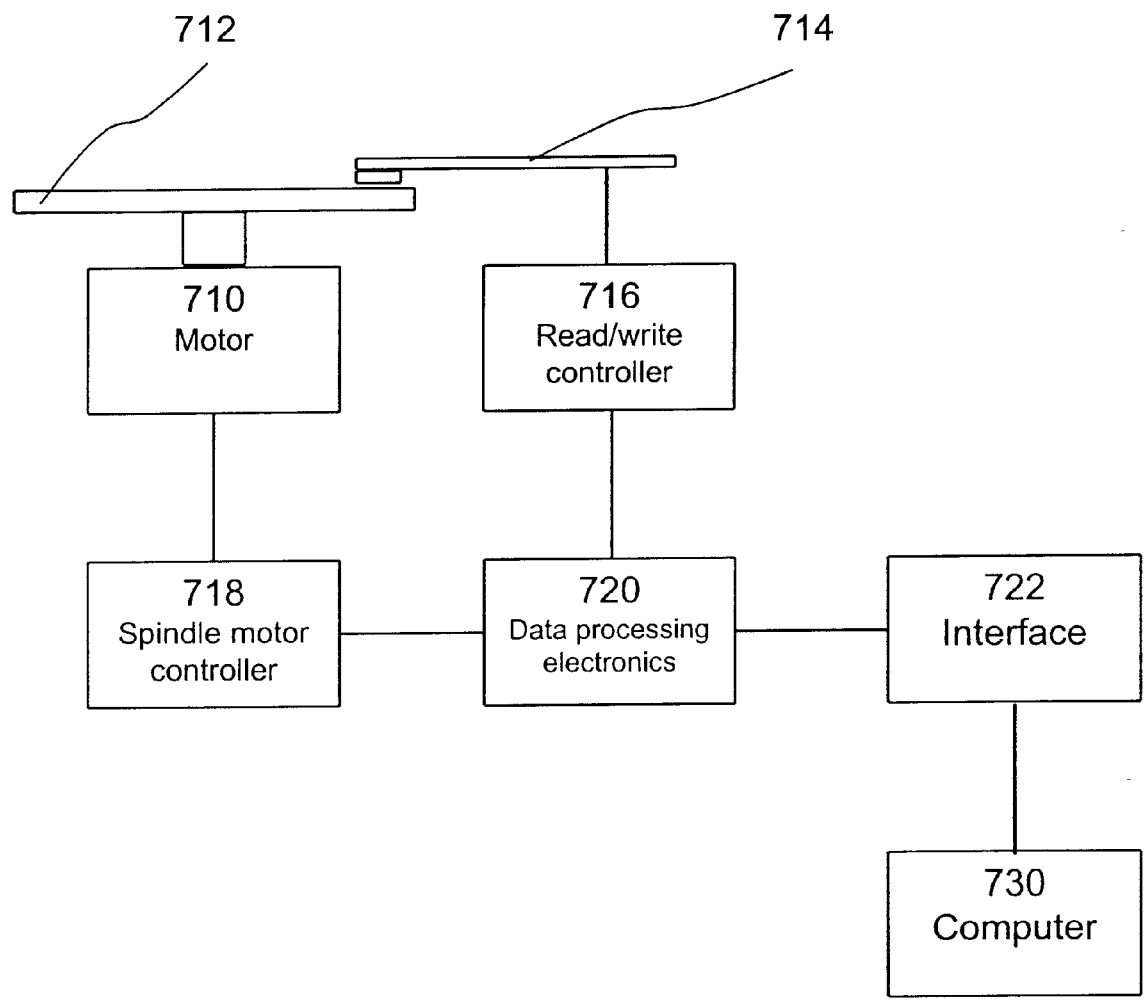
FIG. 7 is a functional block diagram of a data storage device comprising an electrical spindle motor according to the present invention.

As shown in FIG. 7, a data storage device 700 includes an electric spindle motor 710 as described above; at least one data storage disk 712; at least one read/write assembly 714; read/write assembly controller 716; a spindle motor controller 718; a data processing electronics 720 and an interface 722 connected to a computer 730. At the moment of starting, the spindle motor controller 718 sends a first signal to activate the electromagnets of the electric spindle motor 710 to suspend the rotary sub-assembly from the stationary sub-assembly; and a second signal to cause the rotary sub-assembly to rotate. Likely, at the moment of stopping, the spindle motor controller 718 sends a third signal to the electric spindle motor 710 to stop the rotary sub-assembly from rotating; and with a fourth signal to the electromagnets to have the rotary sub-assembly rest again on the rotary sub-assembly.

What is claimed is:

1. An electric spindle motor comprising:
    a stationary sub-assembly having a base and a first supporting member mounted on the base;
    a rotary sub-assembly having a rotating axis and a second supporting member for movably receiving the first supporting member;
    a hydrodynamic journal bearing interposed between the first and the second supporting members;
    a magnetic bearing set positioned between the stationary sub-assembly and the rotary sub-assembly, the magnetic bearing set having at least one electromagnets and at least one thrust plates interactively associated with the at least one electromagnets for controllably suspending the rotary sub-assembly from the stationary sub-assembly; and
    a seal for insulating the hydrodynamic journal bearing and discharging static electric charges from the rotary sub-assembly.

2. The electric spindle motor as claimed in claim 1, wherein the hydrodynamic journal bearing further comprising a first section, a second section and a gap positioned therebetween for containing a lubricant.

3. The electric spindle motor as claimed in claim 1, wherein the seal further comprising a magnetic back ring and a sealing ring having at least one recess for receiving and retaining a magnetic sealing material.

4. The electric spindle motor as claimed in claim 3, wherein the at least one recess of the sealing ring comprises an annular groove opening inwardly to the rotating axis of the rotary sub-assembly.

5. The electric spindle motor as claimed in claim 3, wherein the at least one recess of the sealing ring comprises a wedge opening inwardly to the rotating axis of the rotary sub-assembly.

6. The electric spindle motor as claimed in claim 1, further comprising an absorber for preventing the lubricant from evaporating and blocking external particles from entering into the hydrodynamic journal bearings.

7. The electric spindle motor as claimed in claim 1, further comprising at least one permanent magnets respectively mounted on the at least one thrust plate whereby providing a pre-load for keeping the rotary sub-assembly resting on the stationary sub-assembly.

8. The electric spindle motor as claimed in claim 1, wherein the at least one electromagnet being offset from the at least one thrust plate along an axial direction of the rotating axis.

9. The electric spindle motor as claimed in claim 1, wherein the at least one electromagnet being offset from the at least one thrust plate along a radial direction of the rotating axis.

10. The electric spindle motor as claimed in claim 1, wherein the first supporting member comprises a shaft and the second supporting member comprises a sleeve.

11. The electric spindle motor as claimed in claim 1, wherein the first supporting member comprises a sleeve and the second supporting member comprises a shaft.

12. The electric spindle motor as claimed in claim 1, further comprising a driving sub-assembly for driving the rotary sub-assembly rotating relative to the stationary sub-assembly.

13. An electric spindle motor comprising:
    a stationary sub-assembly having a base; a shaft mounted on the base; a cylindrical extension mounted on the base and coaxially surrounding the shaft, and at least one electromagnet mounted on the extension; the at least one electromagnet having a first magnetic axis; and
    a rotary sub-assembly having a rotating axis, a hub, a sleeve housing mounted within the hub, a cylindrical sleeve mounted within the sleeve housing, at least one magnetic ring attached to the hub and interactively associated with the at least one electromagnet of the stationary sub-assembly; the at least one magnetic ring having a second magnetic axis;
    wherein the at least one electromagnet and the at least one magnetic ring form a magnetic bearing set; and the sleeve and the shaft form a hydrodynamic journal bearing, and wherein the at least one electromagnet comprises a pair of electromagnets and the at least one magnet ring comprises a pair of magnetic rings.

14. The electric spindle motor as claimed in claim 13, wherein the pair of electromagnets being respectively offset from the pair of magnetic rings along an axial direction of the rotating axis; the first magnetic axis being substantially parallel to the second magnetic axis and being further substantially parallel to the rotating axis.

15. The electric spindle motor as claimed in claim 13 or claim 14, wherein the magnetic bearing having a first attraction force for urging the electromagnets toward the magnetic rings, and a second attraction force for keeping the first axis aligned with the second axis.

16. The electric spindle motor as claimed in claim 15, wherein the first attraction force being substantially parallel to the rotating axis and the second attraction force being substantially perpendicular to the rotating axis.

17. The electric spindle motor as claimed in claim 13, wherein the electromagnets being respectively offset from the magnetic rings along a radial direction of the rotating axis; the first magnetic axis being substantially parallel to the second magnetic axis and being substantially perpendicular to the rotating axis.

18. The electric spindle motor as claimed in claim 17, wherein the magnetic bearing having a first attraction force for urging the electromagnets toward the magnetic rings, and a second attraction force for keeping the first axis aligned with the second axis.

19. The electric spindle motor as claimed in claim 18, wherein the first attraction force being substantially perpendicular to the rotating axis and the second attraction force being substantially parallel to the rotating axis.

20. The electric spindle motor as claimed in claim 13, further comprising a driving sub-assembly having a stator, the stator having a stator coil and a yoke mounted on the base; a rotating magnet mounted on the hub and associated with the stator for effecting the rotation of the rotary sub-assembly.

21. A data storage device comprising an electric spindle motor as claimed in claim 1.

22. An electric spindle motor comprising:
- a stationary sub-assembly having a base and a first supporting member mounted on the base;
- a rotary sub-assembly having a rotating axis and a second supporting member for movably receiving the first supporting member;
- a hydrodynamic journal bearing interposed between the first and the second supporting members; and
- a magnetic bearing set positioned between the stationary sub-assembly and the rotary sub-assembly, the magnetic bearing set having at least one electromagnet and at least one thrust plate interactively associated with the at least one electromagnet for controllably suspending the rotary sub-assembly from the stationary sub-assembly, wherein the at least one electromagnet comprises a pair of electromagnets and the at least one trust plate comprises a pair of trust plates.

23. The electric spindle motor as claimed in claim 22, wherein the hydrodynamic journal bearing further comprising a first section, a second section and a gap positioned therebetween for containing a lubricant.

24. The electric spindle motor as claimed in claim 23, wherein the seal further comprising a magnetic back ring and a sealing ring having at least one recess for receiving and retaining a magnetic sealing material.

25. The electric spindle motor as claimed in claim 24, wherein the at least one recess of the sealing ring comprises an annular groove opening inwardly to the rotating axis of the rotary sub-assembly.

26. The electric spindle motor as claimed in claim 24, wherein the at least one recess of the sealing ring comprises a wedge opening inwardly to the rotating axis of the rotary sub-assembly.

27. The electric spindle motor as claimed in claim 22, further comprising an absorber for preventing the lubricant from evaporating and blocking external particles from entering into the hydrodynamic journal bearings.

28. The electric spindle motor as claimed in claim 22, further comprising at least one permanent magnets respectively mounted on the at least one thrust plate whereby providing a pre-load for keeping the rotary sub-assembly resting on the stationary sub-assembly.

29. The electric spindle motor as claimed in claim 22, wherein the at least one electromagnet being offset from the at least one thrust plate along an axial direction of the rotating axis.

30. The electric spindle motor as claimed in claim 22, wherein the at least one electromagnet being offset from the at least one thrust plate along a radial direction of the rotating axis.

31. The electric spindle motor as claimed in claim 22, wherein the first supporting member comprises a shaft and the second supporting member comprises a sleeve.

32. The electric spindle motor as claimed in claim 22, wherein the first supporting member comprises a sleeve and the second supporting member comprises a shaft.

33. The electric spindle motor as claimed in claim 22, further comprising a driving sub-assembly for driving the rotary sub-assembly rotating relative to the stationary sub-assembly.

34. An electric spindle motor comprising:
- a stationary sub-assembly having a base and a first supporting member mounted on the base;
- a rotary sub-assembly having a rotating axis and a second supporting member for movably receiving the first supporting member;
- a hydrodynamic journal bearing interposed between the first and the second supporting members;
- a magnetic bearing set positioned between the stationary sub-assembly and the rotary sub-assembly, the magnetic bearing set having at least one electromagnet and at least one thrust plate interactively associated with the at least one electromagnet for controllably suspending the rotary sub-assembly from the stationary sub-assembly, wherein the at least one electromagnet comprises a pair of electromagnets and the at least one trust plate comprises a pair of trust plates; and
- a seal for insulating the hydrodynamic journal bearing and discharging static electric charges from the rotary sub-assembly.

* * * * *